US012651873B2

(12) United States Patent
Yang

(10) Patent No.: US 12,651,873 B2
(45) Date of Patent: Jun. 9, 2026

(54) PORTABLE LEAKAGE PROTECTION PLUG

(71) Applicant: DongGuan City TuoCheng Industries Co., Ltd, Dongguan (CN)

(72) Inventor: Juntuo Yang, Meizhou (CN)

(73) Assignee: DongGuan City TuoCheng Industries Co., Ltd, Dongguan (CN)

( * ) Notice: Subject to any disclaimer, the term of this patent is extended or adjusted under 35 U.S.C. 154(b) by 349 days.

(21) Appl. No.: 18/400,154

(22) Filed: Dec. 29, 2023

(65) Prior Publication Data

US 2025/0183600 A1 Jun. 5, 2025

(30) Foreign Application Priority Data

Dec. 5, 2023 (CN) ......................... 202323314734.0

(51) Int. Cl.
*H01R 13/71* (2006.01)
*H01R 13/713* (2006.01)

(52) U.S. Cl.
CPC .................................. *H01R 13/713* (2013.01)

(58) Field of Classification Search
CPC .. H01R 13/713; H01R 24/30; H01R 2103/00; H01R 13/7135
See application file for complete search history.

(56) References Cited

U.S. PATENT DOCUMENTS

| | | | | |
|---|---|---|---|---|
| 8,213,139 B2 * | 7/2012 | Li | H01R 13/7135 | 361/42 |
| 9,640,977 B2 * | 5/2017 | Li | H02H 3/33 | |
| 2012/0052702 A1 * | 3/2012 | Zou | H01R 13/7135 | 439/95 |
| 2016/0111869 A1 * | 4/2016 | Li | H02H 3/33 | 361/42 |
| 2018/0158636 A1 * | 6/2018 | Long | H01H 50/20 | |
| 2018/0166833 A1 * | 6/2018 | Nie | H02H 1/0007 | |

FOREIGN PATENT DOCUMENTS

CN 201425994 * 3/2010 ............. H01R 24/30

* cited by examiner

*Primary Examiner* — Truc T Nguyen
(74) *Attorney, Agent, or Firm* — Birchwood IP

(57) ABSTRACT

The present invention discloses a portable leakage protection plug. The plug aims to solve the technical problems that existing leakage protection plugs are overall large, prone to occupy positions of two to three slots of an extension socket after being inserted into the socket and even too large to be mounted. The plug comprises a housing, an output electric wire and plug pins, wherein a control circuit board, a tripping assembly, an inductor, a wiring base and a switch are provided inside the housing; the switch is mounted at an upper side of the control circuit board and is located outside the housing; the control circuit board is located at an upper side inside the housing; and the tripping assembly and the inductor are located at left and right sides of the middle part of the housing. The design of the present invention solves the above-mentioned technical problems.

6 Claims, 7 Drawing Sheets

PORTABLE LEAKAGE PROTECTION PLUG

CROSS-REFERENCE TO RELATED APPLICATIONS

This is a U.S. patent application which claims the priority and benefit of Chinese Patent Application Number 202323314734.0, filed on Dec. 5, 2023, the disclosure of which is incorporated herein by reference in its entirety.

TECHNICAL FIELD

The present invention belongs to the technical field of power circuits, and specifically relates to a portable leakage protection plug.

BACKGROUND

With the increasing popularity of household appliances, people pay more and more attention to the safety of household appliances. At present, many household appliances are equipped with leakage protection plugs at the input ends of the power supply.

An inductor used in an existing leakage protection plug is composed of two circular coils of the same size, which sense a leakage current and whether an output N line is mistakenly grounded, respectively. The disadvantages are as follows: the height is relatively high and the total volume is relatively large; at the same time, a leakage disconnection structure and a leakage inductor structure have relatively large volumes, and the PCBA carrying IC circuits also has a relatively large volume due to an upgraded self-detection function. As a result, the leakage protection plug is overall large, prone to occupy positions of two to three slots of an extension socket after being inserted into the socket and even too large to be mounted.

SUMMARY

(1) Technical Problems to be Solved

In view of the disadvantages in the prior art, the present invention aims to provide a portable leakage protection plug. The plug is intended to solve the technical problems that existing leakage protection plugs are overall large, prone to occupy the positions of two to three slots of the extension socket after being inserted into the socket and even too large to be mounted.

(2) Technical Solution

In order to solve the above-mentioned technical problems, the present invention provides such a portable leakage protection plug. The plug comprises a housing, an output electric wire and plug pins, wherein a control circuit board, a tripping assembly, an inductor, a wiring base and a switch are provided inside the housing; the switch is mounted at an upper side of the control circuit board and is located outside the housing; the control circuit board is located at an upper side inside the housing; the tripping assembly and the inductor are located at left and right sides of the middle part of the housing; the plug pin and the wiring base are located at left and right sides of a bottom end inside the housing; and a static contact and a movable contact are fixedly connected on the control circuit board, the movable contact is an elastic structure, the static contact is in communication with the plug pin by a conductor wire, the movable contact is in communication with the wiring base by an induction wire in a way of bypassing the inductor, and the tripping assembly is used for connecting and disconnecting the static contact and the movable contact.

Preferably, the housing comprises an upper cover, a lower cover and a movable cover, and the lower cover and the movable cover are both fixedly connected to the upper cover by screws.

Further, the inductor comprises a first coil and a second coil arranged on the same layer inside and outside, and the diameter of the first coil is greater than that of the second coil.

Still further, the tripping assembly comprises a fixed frame, a tripping coil, a tripping iron core and a tripping spring; the tripping iron core is mounted on the fixed frame; the tripping coil is sleeved on an outer surface of the tripping iron core, and a right end of the tripping iron core penetrates through the fixed frame and is fixedly connected to a bridge bracket; the tripping spring is sleeved on an outer surface of the tripping iron core and is located between the bridge bracket and the fixed frame; and a bottom end of the movable contact penetrates through the bridge bracket.

Still further, the bridge bracket comprises a movable block and supporting blocks fixedly connected to front and rear sides of the movable block; and the supporting block is provided with a through groove, the movable contact is located in the through groove, and arcs are provided on two sides of the through groove.

Still further, a protective sleeve is provided at an outer side of the tripping assembly, the protective sleeve is fixedly connected to the control circuit board by a buckle, and a movable cavity corresponding to the movable block is provided at the right side of the protective sleeve.

Still further, the plug pin is fixedly connected to the protective sleeve through an insulating base, and the wiring base is mounted on the lower cover, with one end located inside the housing.

(3) Beneficial Effects

Compared with the prior art, the beneficial effects of the present invention lie in that:

1. The present invention reduces the length of the induction wire and therefore the cost of the induction wire by placing the wiring base close to the bottom of the inductor; moreover, the switch used has a reduced height while meeting the requirements; and at the same time, the inductor is changed to be composed of one large circular coil and one small circular coil arranged on the same layer inside and outside, respectively, and the total volume becomes smaller while the performance is not reduced, thereby achieving the effect of reducing the overall volume and avoiding mounting failure of the plug.
2. The present invention uses the design of the simplest and most effective relay pull-in method by simplifying the tripping assembly as much as possible. In order to prevent the contacts from sticking due to a large current leakage and other reasons after pull-in, a moderately tight clamping position is designed on the bridge bracket, so that when the large current leakage occurs, the small-volume tripping assembly can still trip normally from the tripping spring by relying on the movable contact of the elastic structure.
3. Each module of the tripping assembly module, the inductor module and the control circuit board module inside the housing of the present invention can be produced separately and checked for qualification before being assembled, which will greatly improve the qualification rate of the finished products.

NUMERAL SIGNS IN THE DRAWINGS

Figure 1:
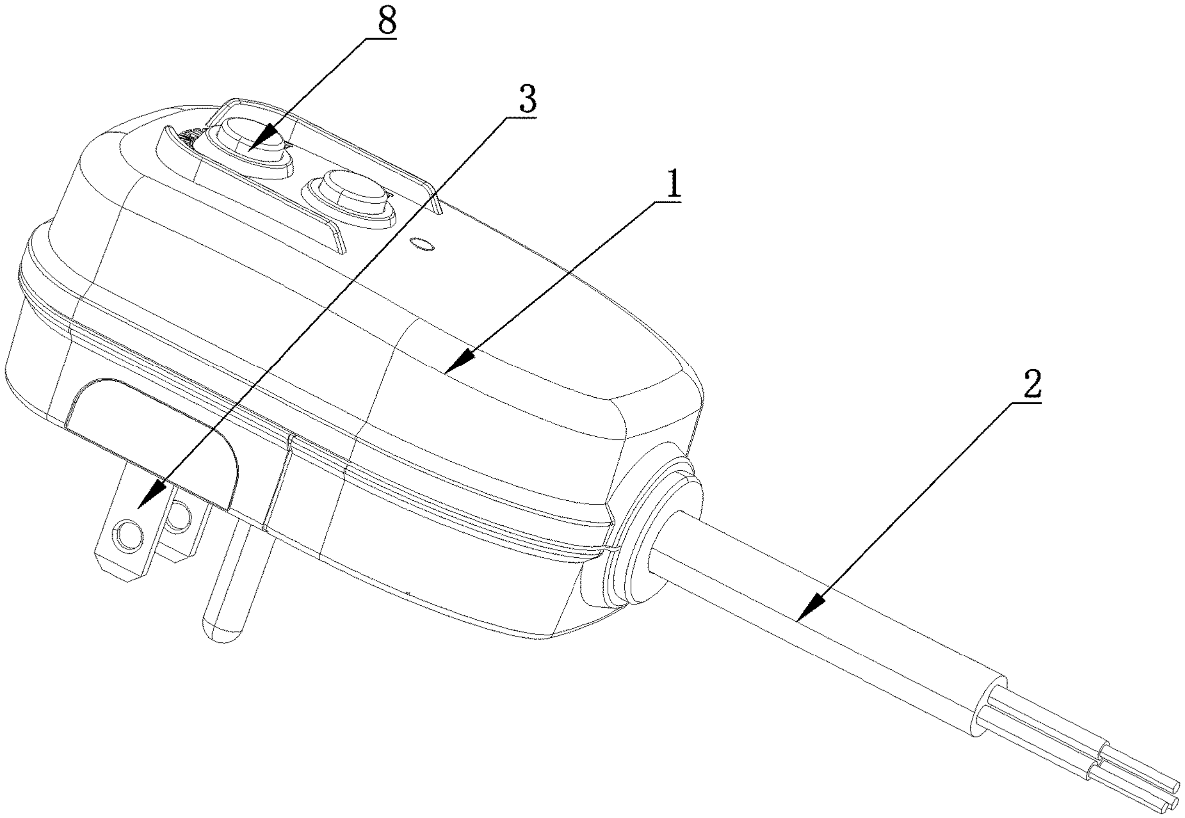
FIG. 1 is a three-dimensional structural schematic diagram of the present invention.

1. Housing; 2. Output electric wire; 3. Plug pin; 4. Control circuit board; 5. Tripping assembly; 6. Inductor; 7. Wiring base; 8. Switch; 9. Static contact; 10. Movable contact; 11. Conductor wire; 12. Induction wire; 101. Upper cover; 102. Lower cover; 103. Movable cover; 104. Screw; 601. First coil; 602. Second coil; 501. Fixed frame; 502. Tripping coil; 503. Tripping iron core; 504. Tripping spring; 505. Bridge bracket; 506. Movable block; 507. Supporting block; 508. Through groove; 13. Protective sleeve; 14. Buckle; 15. Movable cavity; 16. Insulating base.

DESCRIPTION OF EMBODIMENTS

The specific embodiment is a portable leakage protection plug with structural schematic diagrams thereof shown in FIGS. 1-7. The plug comprises a housing 1, an output electric wire 2 and plug pins 3, wherein a grounding wire of the output electric wire 2 is in communication with a grounding terminal of the plug pin 3; a control circuit board 4, a tripping assembly 5, an inductor 6, a wiring base 7 and a switch 8 are provided inside the housing 1; the switch 8 is mounted at an upper side of the control circuit board 4 and is located outside the housing 1; the control circuit board 4 is located at an upper side inside the housing 1; the tripping assembly 5 and the inductor 6 are located at left and right sides of the middle part of the housing 1; the plug pin 3 and the wiring base 7 are located at left and right sides of a bottom end inside the housing 1; and a static contact 9 and a movable contact 10 are fixedly connected on the control circuit board 4, the movable contact 10 is an elastic structure, the static contact 9 is in communication with the plug pin 3 by a conductor wire 11, the movable contact 10 is in communication with the wiring base 7 by an induction wire 12 in a way of bypassing the inductor 6, and the tripping assembly 5 is used for connecting and disconnecting the static contact 9 and the movable contact 10.

Figure 2:
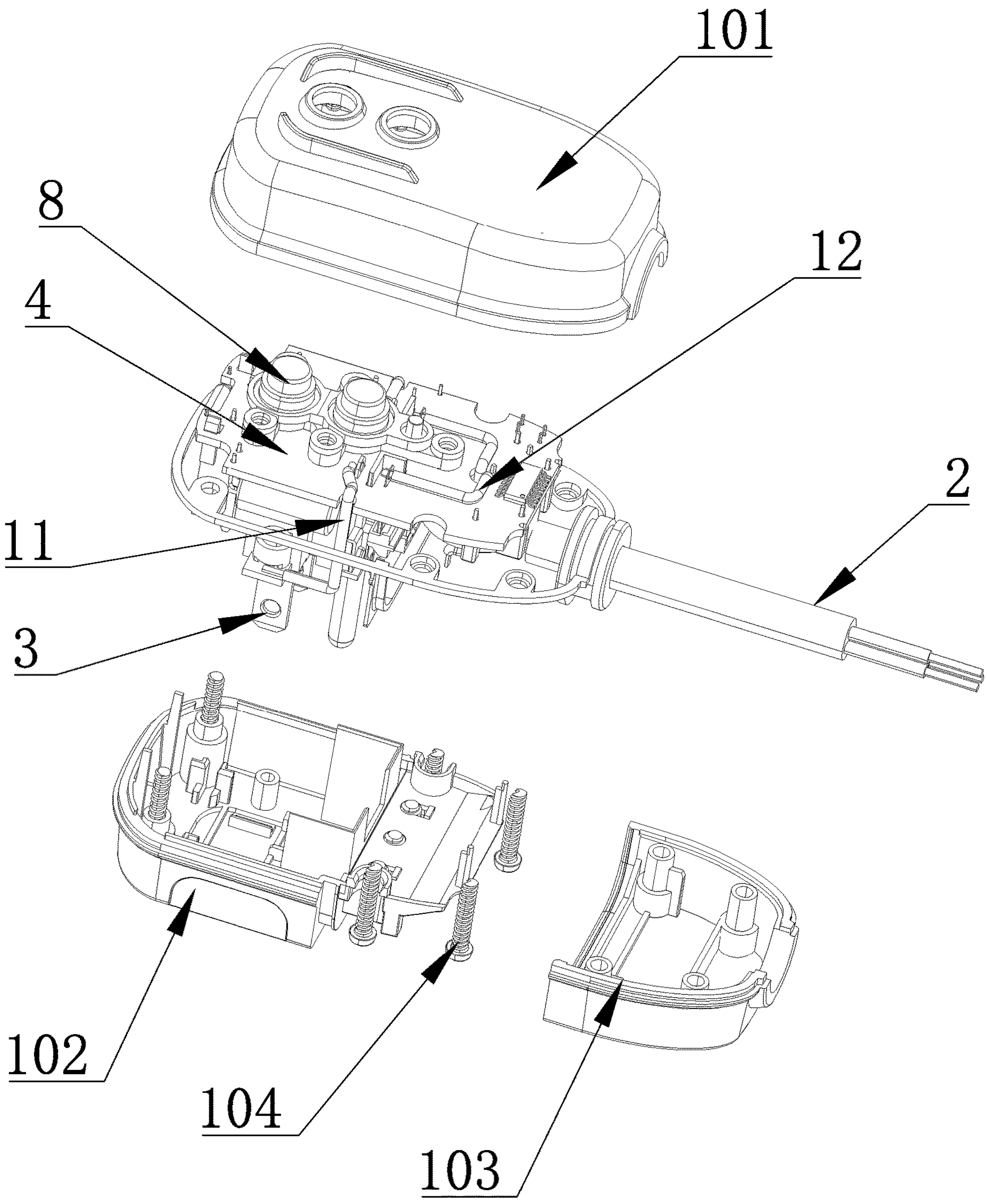
FIG. 2 is a structural schematic diagram of an exploded structure of the present invention.

As shown in FIGS. 1 and 2, the housing 1 comprises an upper cover 101, a lower cover 102 and a movable cover 103. The lower cover 102 and the movable cover 103 are both fixedly connected to the upper cover 101 by screws 104, so that the movable cover 103 can be opened during wiring arrangement to facilitate the mounting of the output electric wire 2 and the wiring base 7.

Figure 3:
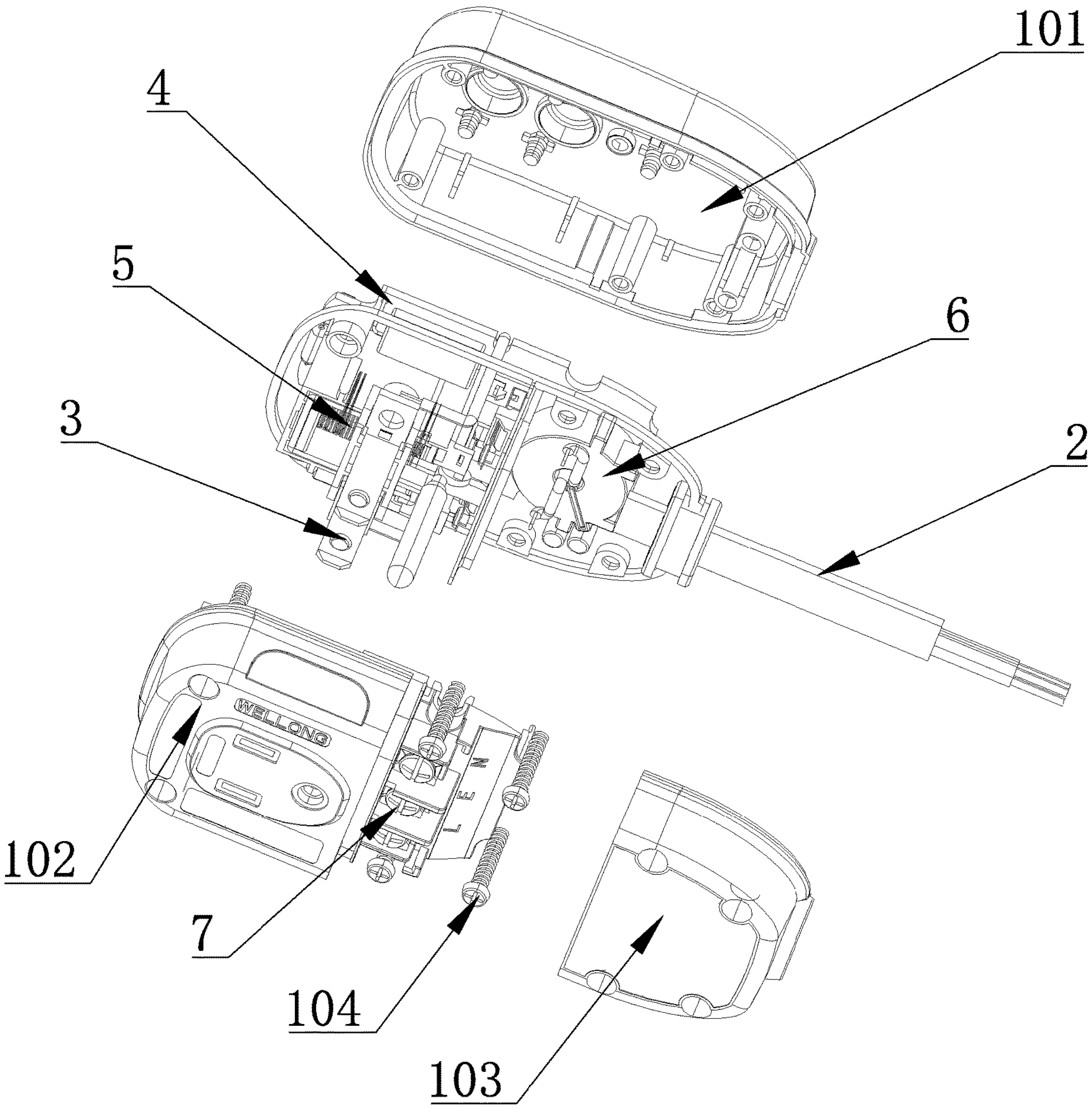
FIG. 3 is an upward-view structural schematic diagram of an exploded structure of the present invention.
Figure 4:
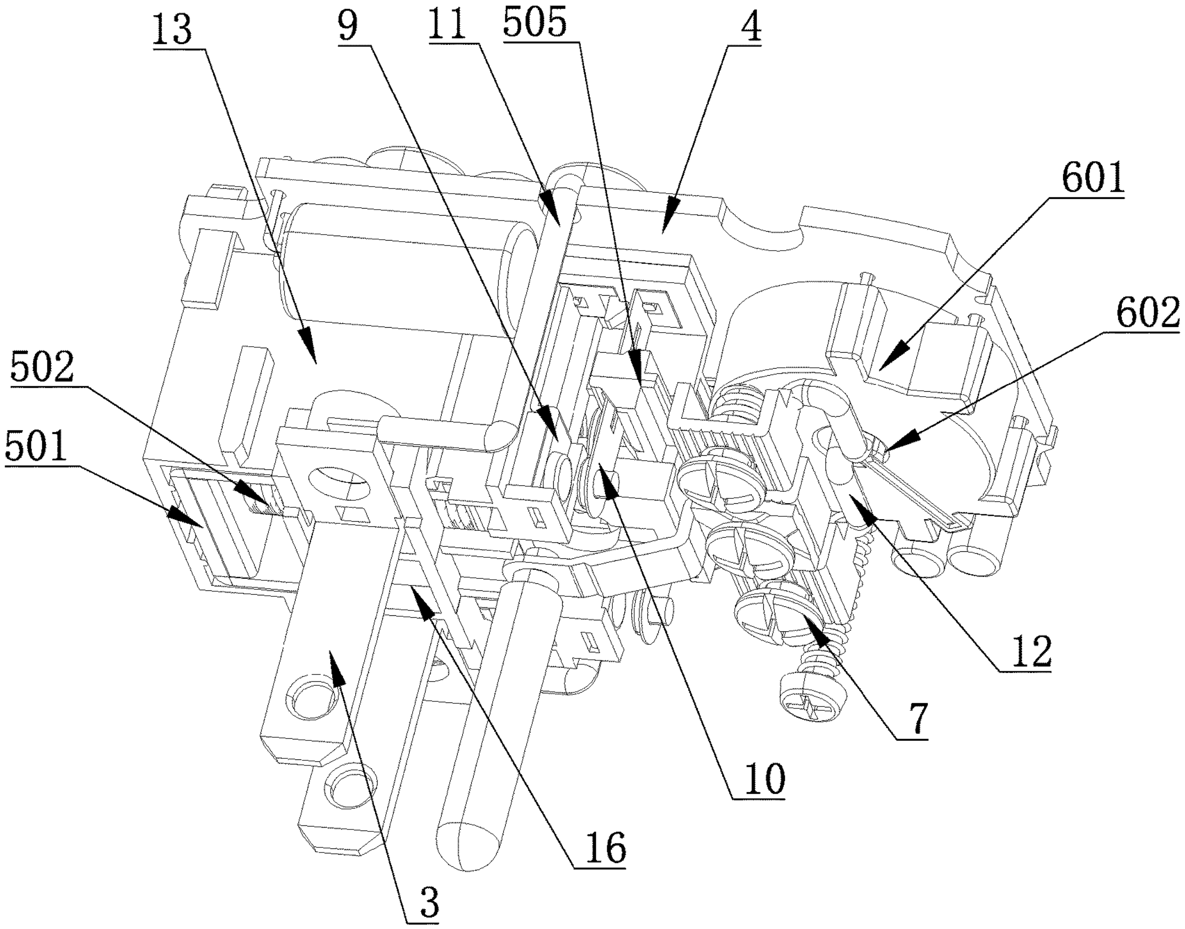
FIG. 4 is an internal structural schematic diagram of a housing of the present invention.

As shown in FIGS. 3 and 4, the inductor 6 comprises a first coil 601 and a second coil 602 arranged on the same layer inside and outside. The diameter of the first coil 601 is greater than that of the second coil 602.

In this way, the arrangement is changed to comprise one large circular coil and one small circular coil arranged on the same layer inside and outside, respectively. Therefore, the total volume becomes smaller while the performance is not reduced.

Figure 5:
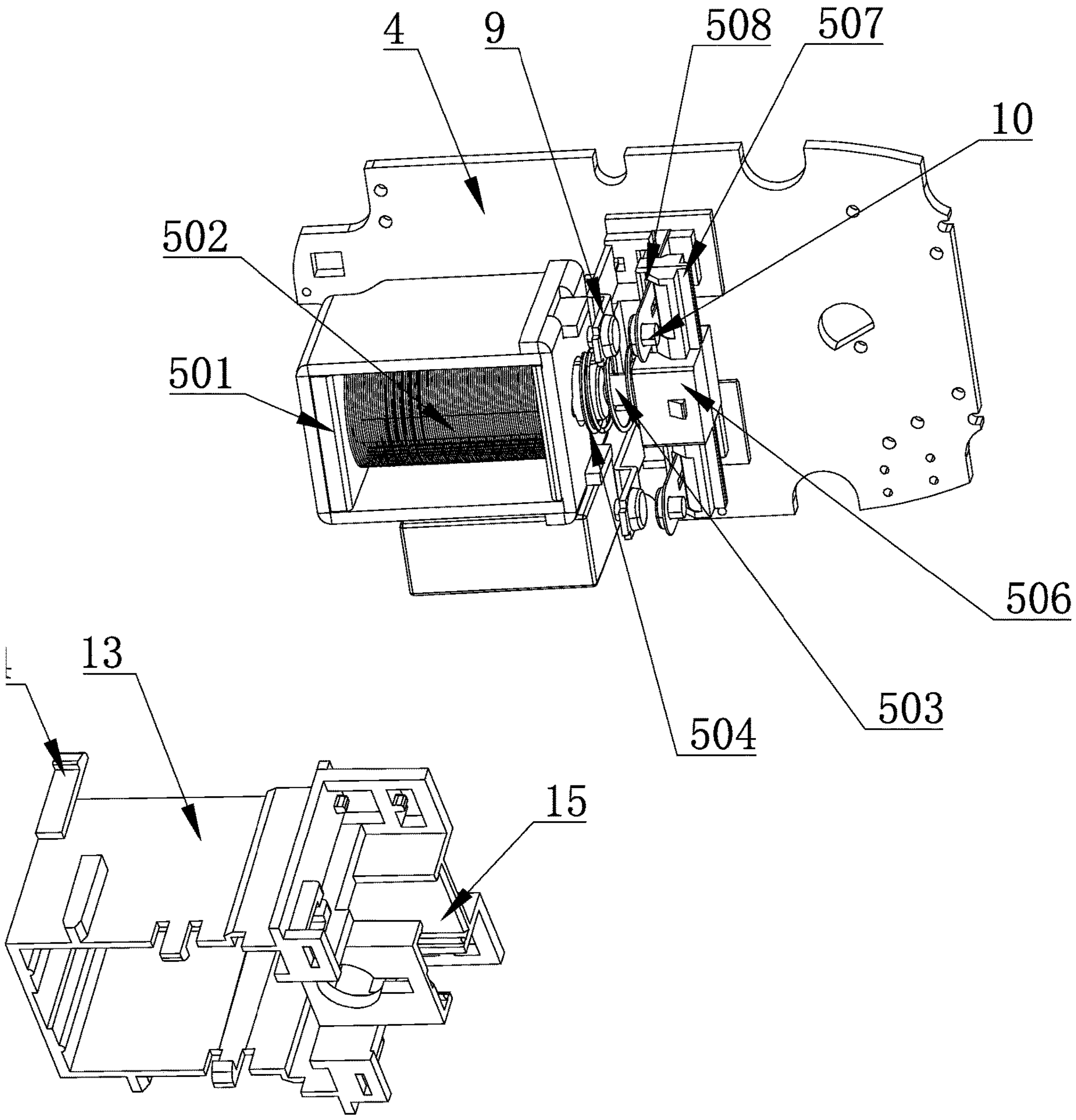
FIG. 5 is a structural schematic diagram of a tripping assembly of the present invention.

As shown in FIGS. 3, 4 and 5, the tripping assembly 5 comprises a fixed frame 501, a tripping coil 502, a tripping iron core 503 and a tripping spring 504; the tripping iron core 503 is mounted on the fixed frame 501; the tripping coil 502 is sleeved on an outer surface of the tripping iron core 503, and a right end of the tripping iron core 503 penetrates through the fixed frame 501 and is fixedly connected to a bridge bracket 505; the tripping spring 504 is sleeved on an outer surface of the tripping iron core 503 and is located between the bridge bracket 505 and the fixed frame 501; and a bottom end of the movable contact 10 penetrates through the bridge bracket 505.

Such an arrangement simplifies the tripping structure as much as possible and uses the design of the simplest and most effective relay pull-in method.

As shown in FIGS. 4 and 5, the bridge bracket 505 comprises a movable block 506 and supporting blocks 507 fixedly connected to front and rear sides of the movable block 506; and the supporting block 507 is provided with a through groove 508, the movable contact 10 is located in the through groove 508, and arcs are provided on both sides of the through groove 508.

For such an arrangement, a moderately tight clamping position is designed on the bridge bracket 505, so that when a large current leakage occurs, the small-volume tripping assembly 5 can still trip normally from the tripping spring 504 by relying on the movable contact 10 of the elastic structure, thereby preventing the contacts from sticking due to the large current leakage and other reasons after pull-in.

Figure 6:
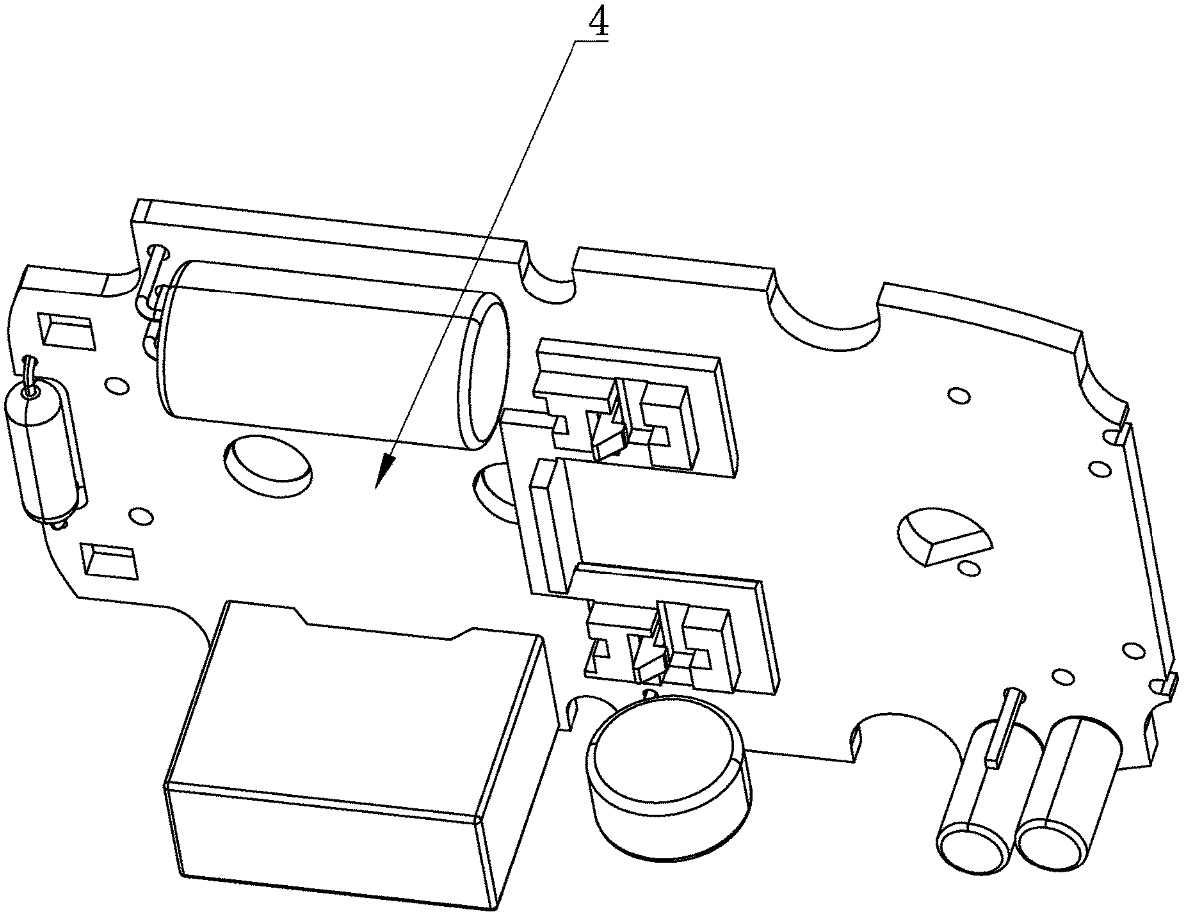
FIG. 6 is a structural schematic diagram of a control circuit of the present invention.
Figure 7:
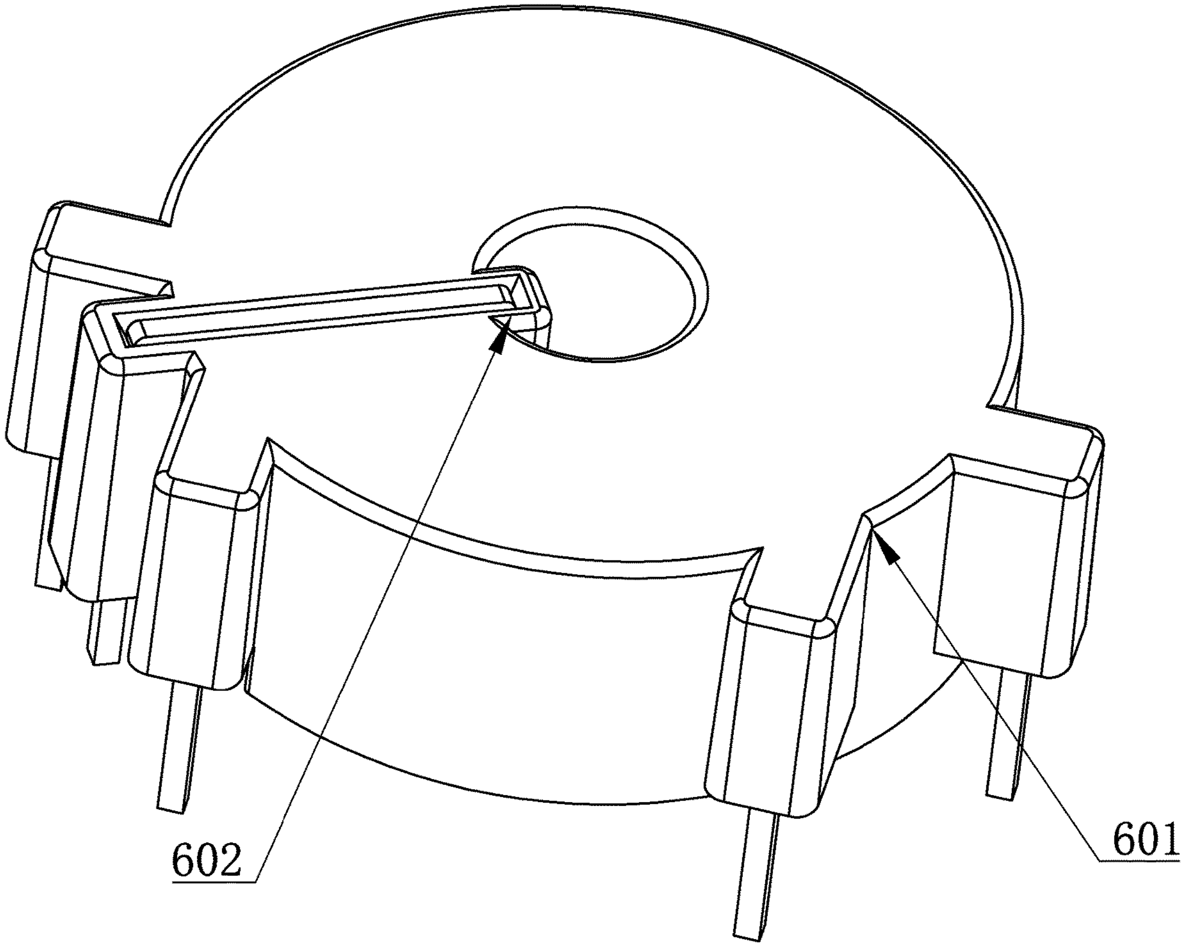
FIG. 7 is a structural schematic diagram of an inductor of the present invention.

As shown in FIGS. 5 and 6, a protective sleeve 13 is provided at an outer side of the tripping assembly 5, the protective sleeve 13 is fixedly connected to the control circuit board 4 by a buckle 14, and a movable cavity 15 corresponding to the movable block 506 is provided at the right side of the protective sleeve 13. The protective sleeve 13 arranged in this way is used for protecting and fixing the tripping assembly 5, which is more convenient for mounting.

As shown in FIGS. 2 and 3, the plug pin 3 is fixedly connected to the protective sleeve 13 through an insulating base 16, and the wiring base 7 is mounted on the lower cover 102, with one end located inside the housing 1. The insulating base 16 arranged in this way is used for insulating the plug pin 3, so as to prevent the plug pin 3 from having an electric leakage.

Working principle: the invention reduces the length of the induction wire 12 and therefore the cost of the induction wire 12 by placing the wiring base 7 close to the bottom of the inductor 6; moreover, the switch used has a reduced height while meeting the requirements; and at the same time, the inductor 6 is changed to be composed of one large circular coil and one small circular coil arranged on the same layer inside and outside, respectively, and the total volume becomes smaller while the performance is not reduced, thereby achieving the effect of reducing the overall volume. The tripping assembly 5 is simplified as much as possible to use the design of the simplest and most effective relay pull-in method. In order to prevent the contacts from sticking due to a large current leakage and other reasons after pull-in, a moderately tight clamping position is designed on the bridge bracket, so that when the large current leakage occurs, the small-volume tripping assembly can still trip normally from the tripping spring 504 by relying on the movable contact 10 of the elastic structure. During use, the inductor 6 monitors a current difference of the output electric wire 2 to check whether there is any electric leakage. When the current difference reaches a preset range, a preset IC program will control the tripping assembly 5 with electric leakage to disconnect the static contact 9 and the movable contact 10 of a main circuit, thereby cutting off the power supply for electrical safety protection.

The above-mentioned embodiments are the preferred embodiments of the present invention. In addition, the present invention can also be implemented in other ways. Any obvious substitutions without departing from the concept of the technical solution are within the protection scope of the present invention.

What is claimed is:

1. A portable leakage protection plug, comprising: a housing, an output electric wire and plug pins, wherein a control circuit board, a tripping assembly, an inductor, a wiring base and a switch are provided inside the housing; the switch is mounted at an upper side of the control circuit board and is located outside the housing; the control circuit board is located at an upper side inside the housing; the tripping assembly and the inductor are located at left and right sides of the middle part of the housing; and the plug pin and the wiring base are located at left and right sides of a bottom end inside the housing;

a static contact and a movable contact are fixedly connected on the control circuit board, the movable contact is an elastic structure, the static contact is in communication with the plug pin by a conductor wire, the movable contact is in communication with the wiring base by an induction wire in a way of bypassing the inductor, and the tripping assembly is used for connecting and disconnecting the static contact and the movable contact;

wherein the tripping assembly comprises a fixed frame, a tripping coil, a tripping iron core and a tripping spring; the tripping iron core is mounted on the fixed frame; the tripping coil is sleeved on an outer surface of the tripping iron core, and a right end of the tripping iron core penetrates through the fixed frame and is fixedly connected to a bridge bracket; the tripping spring is sleeved on an outer surface of the tripping iron core and is located between the bridge bracket and the fixed frame; and a bottom end of the movable contact penetrates through the bridge bracket.

2. The portable leakage protection plug according to claim 1, wherein the housing comprises an upper cover, a lower cover and a movable cover; and the lower cover and the movable cover are both fixedly connected to the upper cover by screws.

3. The portable leakage protection plug according to claim 2, wherein the inductor comprises a first coil and a second coil arranged on the same layer inside and outside, and the diameter of the first coil is greater than that of the second coil.

4. The portable leakage protection plug according to claim 1, wherein the bridge bracket comprises a movable block and supporting blocks fixedly connected to front and rear sides of the movable block; and the supporting block is provided with a through groove, the movable contact is located in the through groove, and arcs are provided on two sides of the through groove.

5. The portable leakage protection plug according to claim 4, wherein a protective sleeve is provided at an outer side of the tripping assembly, the protective sleeve is fixedly connected to the control circuit board by a buckle, and a movable cavity corresponding to the movable block is provided at a right side of the protective sleeve.

6. The portable leakage protection plug according to claim 5, wherein the plug pin is fixedly connected to the protective sleeve through an insulating base, and the wiring base is mounted on the lower cover, with one end located inside the housing.

* * * * *